US009155391B2

(12) United States Patent
Klinke et al.

(10) Patent No.: US 9,155,391 B2
(45) Date of Patent: Oct. 13, 2015

(54) LINEAR ACTUATOR

(75) Inventors: Norbert Klinke, Augustenborg (DK);
Søren Lolk, Hørning (DK)

(73) Assignee: Linak A/S, Nordburg (DK)

( * ) Notice: Subject to any disclaimer, the term of this patent is extended or adjusted under 35 U.S.C. 154(b) by 0 days.

(21) Appl. No.: 12/736,849

(22) PCT Filed: Jun. 8, 2009

(86) PCT No.: PCT/DK2009/000136
§ 371 (c)(1),
(2), (4) Date: Nov. 16, 2010

(87) PCT Pub. No.: WO2009/146708
PCT Pub. Date: Dec. 10, 2009

(65) Prior Publication Data
US 2011/0061570 A1 Mar. 17, 2011

(30) Foreign Application Priority Data
Jun. 6, 2008 (DK) .................................. 2008 00776

(51) Int. Cl.
A47B 9/00 (2006.01)
A47C 3/20 (2006.01)
A47B 9/20 (2006.01)
F16H 25/20 (2006.01)
A47B 9/04 (2006.01)

(52) U.S. Cl.
CPC ... *A47C 3/20* (2013.01); *A47B 9/20* (2013.01); *F16H 25/2021* (2013.01); *A47B 9/04* (2013.01); *A47B 2200/0059* (2013.01); *F16H 25/20* (2013.01)

(58) Field of Classification Search
CPC .......................................................... A47B 9/04
USPC ............. 108/147, 147.19; 248/599, 602, 161; 74/89.35
See application file for complete search history.

(56) References Cited

U.S. PATENT DOCUMENTS

| 4,496,865 | A | 1/1985 | Allen et al. | |
|---|---|---|---|---|
| 5,282,593 | A * | 2/1994 | Fast | 248/188.4 |
| 5,495,811 | A | 3/1996 | Carson et al. | |
| 6,494,005 | B2 * | 12/2002 | Zimmerman | 52/296 |
| 6,595,144 | B1 * | 7/2003 | Doyle | 108/147 |
| 6,705,239 | B2 * | 3/2004 | Doyle | 108/147 |
| 7,049,728 | B2 | 5/2006 | Bastholm | |
| 7,066,041 | B2 | 6/2006 | Nielsen | |
| 2003/0052626 | A1 | 3/2003 | Wehmeyer et al. | |
| 2003/0101837 | A1 * | 6/2003 | Abrahamsen | 74/425 |

(Continued)

FOREIGN PATENT DOCUMENTS

EP 1584264 A1 * 10/2005

*Primary Examiner* — Daniel J Troy
*Assistant Examiner* — Andres F Gallego
(74) *Attorney, Agent, or Firm* — Dykema Gossett PLLC

(57) ABSTRACT

A linear actuator (8) in which a squeeze protection device is arranged, where the device is located in connection with the rear fixture (17) on the motor (10). The squeeze protection device is based on a piezo element (23), which as a module (22) is built into the actuator (8), so that it is passed through by the forces, exerted by the actuator (8). The piezo element (23) is equipped with cables (30), which are connected to a printed circuit board (31) in the actuator (8), where the connections for the actuator (8) are collected, so that the signal from the squeeze protection in an easy manner may be communicated to a control device (6), which can stop the motor (10) or briefly reverse the direction of the movement and thus release a trapped object.

12 Claims, 4 Drawing Sheets

(56) References Cited

U.S. PATENT DOCUMENTS

2004/0211275 A1* 10/2004 Fich et al. .................... 74/89.23
2006/0279143 A1* 12/2006 Platz et al. ..................... 310/51
2007/0169578 A1 7/2007 Christensen et al.
2010/0187379 A1 7/2010 Kragh et al.

* cited by examiner

LINEAR ACTUATOR

BACKGROUND OF THE INVENTION

1. Field of the Invention

The invention relates to an actuator with squeeze protection.

2. The Prior Art

The explanation of the invention starts with a linear actuator of the type that includes a linear movable, tubular activation element. A linear actuator includes an electric motor which, through a transmission, drives a spindle. On the spindle rides a spindle nut, to which one end of the tubular activation element is secured. The other end of the tubular activation element is secured with a front fixture to a movable element in a structure in which the actuator is incorporated, while a rear fixture is secured in the stationary part of the structure, or vice versa. By rotating the spindle nut, this will either move outwards or inwardly on the spindle, depending on the direction of rotation, and the tube section thus will move axially outwardly or retract in a manner corresponding to the piston rod on a telescopic cylinder.

Linear actuators are widely used in adjustable furniture, such as beds, chairs or tables, for adjusting, e.g., the height, of a table or the mattress surface of a bed.

In relation to adjustable furniture, personal safety is an area of priority. A linear actuator exerts large forces during the adjustment of an article of furniture, for which reason there is a risk for personal injury if a body part is caught in the furniture. Even though the consideration for personal safety is the main objective, a further consideration should also be shown for the actuator. In case of an adjustable table, an encounter with a windowsill/computer shelf or another table could, e.g., block the movement and result in the actuator being overloaded and damaged.

A device for squeeze protection in connection with a table is known from U.S. Pat. No. 5,495,811 to Ergoflex Systems, where a trapped object will activate a switch in the form of a ribbon switch, which subsequently interrupts the power supply to the actuator. The device requires the contact element to be spread out over all surfaces where there might be a risk of squeezing. In case of a table where squeezing may occur between an object and the upper side and underside of the tabletop, respectively, the outlined solution is difficult to implement and not practical.

Another device is known from US 2003/0052626 A1 to Dewert Antriebsund Systemtechnik, where a measurement of the motor current is carried out as an expression for the load on the motor. A blocking of the mechanism would cause the motor current to rise momentarily, as a result of which the current to the motor may be interrupted to avoid squeezing of an object and overload of the appliance and the motor. The arrangement is as far as it goes fine by being a simple solution which is easy to implement. The challenge is that the load on an adjustable table varies with the amount of equipment which is placed on the table and the position of the equipment. The same applies to a bed, where the load depends on the weight of the person using the bed and whether the person is fully or partly positioned in the bed. As the actuator must be able to exert forces which counteract the load, a threshold for the limitation of the motor current will have to be so high that no gentle protection from injuries due to squeezing is provided for the person.

A squeeze protection for use in connection with an actuator is further known from WO 03/056976 to Linak A/S. The squeeze protection is arranged in a housing, which with a special fixture can form a connection between the actuator and the table top. The device may be supplied with new systems but is also suitable for retrofitting. The solution is as far as it goes fine but complicated as the electrical connection for the squeeze protection will have to be separately led to the operation unit. Further, it is beset with great difficulties to install the device. Another factor is that the constructional height of the column is extended by the height of the device, for which reason the lowest adjustment height for the column is undesirably increased. Since the device consists of many parts, it is also relatively expensive.

A solution is thus needed which safely but in a simpler manner solves the problem of injuries due to squeezing during the adjustment of the above-mentioned adjustable articles of furniture.

The purpose of the invention is to provide a solution to the outlined problem, i.e., to achieve a safe squeeze protection, which in addition to being simple and compact also functions independently from the load on the appliance. Further, a solution is desired which if possible is completely integrated with the actuator, so that unnecessary wiring and assembling is avoided. A solution is sought which as far as possible cooperates with the existing parts in the actuator and thus in an integration does not take up more space and is inexpensive.

SUMMARY OF THE INVENTION

This is achieved according to the invention by designing the linear actuator so that the squeeze protection device is arranged in direct or indirect connection with an end of the electric motor.

In that the squeeze protection device is built in a compact and simple manner, it is thus possible to place the device in the housing in connection with an end of the motor, thus avoiding difficult assembly work during the assembly of the actuator and the squeeze protection on the appliance, which is otherwise the case in the prior art. Further, extra wiring between a device for squeeze protection, located outside the actuator, and the actuator or to a control box for operating the actuator is avoided, as the required cable connections may be run internally in the housing of the actuator. As the squeeze protection device is compact, it may by means of small modifications of the actuator be arranged in already existing space in the actuator. The actuator with the device for squeeze protection may likewise be manufactured in a more inexpensive manner as a joint unit in production. The invention provides a solution which in a highly satisfactory manner meets the requirements stated above.

The device for squeeze protection comprises a piezo element, which is particularly expedient as a piezo element does not express a static state, but only a dynamic movement when the piezo element is activated. The activation is caused by the piezo element getting squeezed or bent, at which a brief voltage pulse is generated. In case the piezo element is of the type constituting the membrane in an acoustic sound generator, this is moved, when being used as an acoustic sound generator, in that an electric voltage is applied between two points on the disc, causing the piezo crystals to expand or retract. A corresponding effect is achieved when a piezo element is bent, with a voltage generated that can be used as an expression for the deflection of the piezo element.

By locating the device for squeeze protection in connection with an end of the motor, it is achieved that the squeeze protection with an end is embedded to an unyielding part in the housing. A second part of the device for squeeze protection is connected to another unyielding part, which is connected to a fixture. Between the two unyielding parts is located a compressible part, which originally is inserted to obtain a mechanical noise dampening in the actuator. The compressible part will, since the forces exerted by the actuator run through this part, be compressed or expanded respectively, depending on whether the actuator exerts pressure or pull between the two unyielding parts.

The compressible part is equipped with a hollow in which the device for squeeze protection may be arranged. The device for squeeze protection thus follows the movement in the compressible part by being placed between the two unyielding parts.

The device for squeeze protection may expediently be designed as a module provided by a housing in which a piezo element suspended in a spring is mounted.

To retain the device for squeeze protection in connection with the first unyielding part, the housing is equipped with snap-locking means, which with co-operative snap-locking means designed in connection with the motor, retains the device in connection with the motor. The first unyielding part should further be designed so that the piezo element does not rest on this with its entire surface. This is practically done in that the circular membrane-like piezo element with its outer rim rests on an edge which forms a guide on the first unyielding part. When the second unyielding part is placed on top of the compressible part, having the squeeze protection device mounted, the second unyielding part will press the housing with the squeeze protection further into the compressible part. The spring, which with one end is secured to the housing, will at a point, preferably the center point, on the membrane-like piezo element exert a pressure on the piezo element, which thus in the normal state where the actuator does not exert forces, will be supplied with a pretension. This pretension ensures that the piezo element is capable of indicating a squeezing in both directions of the movement. The design with the compressible part and the spring for transferring the forces between the two unyielding parts is particularly expedient in that the piezo element only tolerates a minimal deflection. The spring is thus dimensioned to, in relation to the compressible part, only to transfer a small portion of the forces, exercised between the two unyielding parts.

The piezo element may be equipped with a cable connection which practically may be designed with a plug connection. The actuator is already furnished with a printed circuit board having a design, which comprises a micro processor to which the piezo element may be connected. However, this does not preclude the piezo element from being equipped with its own separate circuit on the printed circuit board, which independently from other circuits in the actuator may momentarily interrupt the current to the motor, alternatively briefly reverses the rotation of the motor in order to release a trapped object. Signal cables used for communicating with a control unit from which the adjustment of the actuator may be performed are led from the printed circuit board out of the actuator. The design with the micro processor results in that functions, such as determination of the position of the spindle nut during its travel on the spindle, may be performed, but also that data may be communicated from the actuator to the control unit via a cable. The squeeze protection device thus benefits from this design in that it may easily be built-in and incorporated in the actuator, not only mechanically but also electrically.

BRIEF DESCRIPTION OF THE DRAWINGS

A linear actuator according to the invention will be explained more fully below with reference to the accompanying drawings, in which:

FIG. 2a shows a detail of the upper end of the column of FIG. 2.

DETAILED DESCRIPTION OF THE PREFERRED EMBODIMENT

Figure 1:
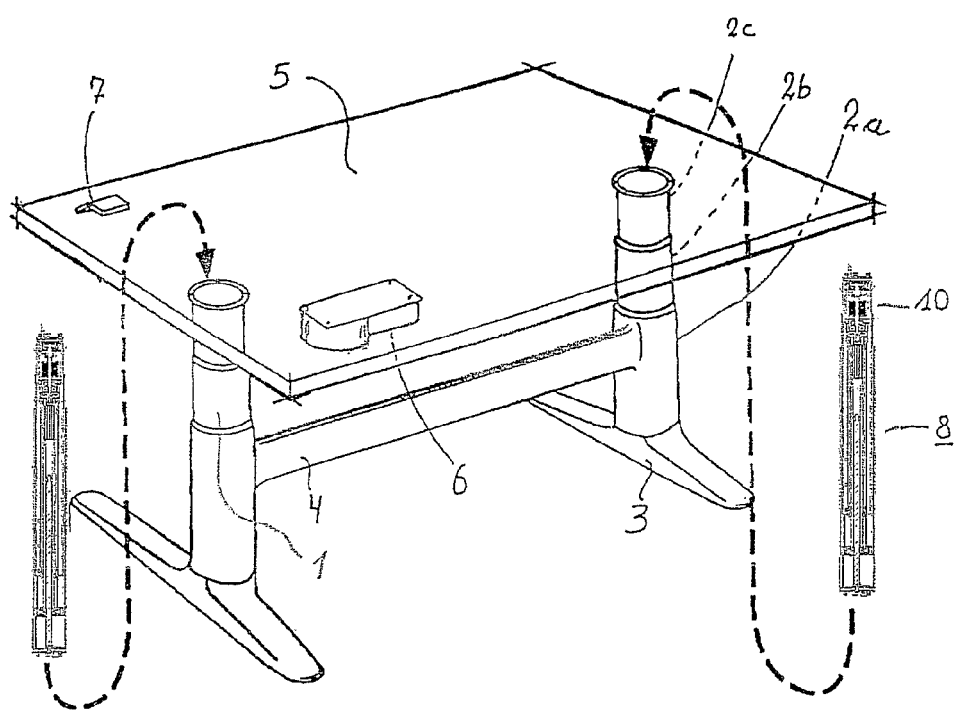
FIG. 1 shows a height-adjustable table where the table top is shown as transparent and the actuators are shown separately and in their retracted state.

The table shown in FIG. 1, includes a lifting column 1 at each side. Each lifting column 1 provides three cooperative telescopic members 2a, 2b, 2c, where the lower member 2a is fixedly connected to a foot 3. Further, it can be seen that the two columns 1 are interconnected with a cross beam 4 attached to the lower telescopic member 2a of the first or the second column 1, respectively. The table top 5 is mounted on the topmost telescopic member 2c, which is not shown in the drawing to avoid unnecessary details. The mounting of the table top 5 varies from one table to another, but generally it applies that the table manufacturer uses brackets which may be connected to the fixtures on the column 1, where after the table top 5 is mounted on the lower frame 1, 3, 4 with the bracket. The movement of the column 1 and thus the adjustment of the height of the table 5 is performed by a motor drive which is a linear actuator 8. To the actuator is connected a control device 6 and an operation device 7 for adjusting the actuator 8.

Figure 2:
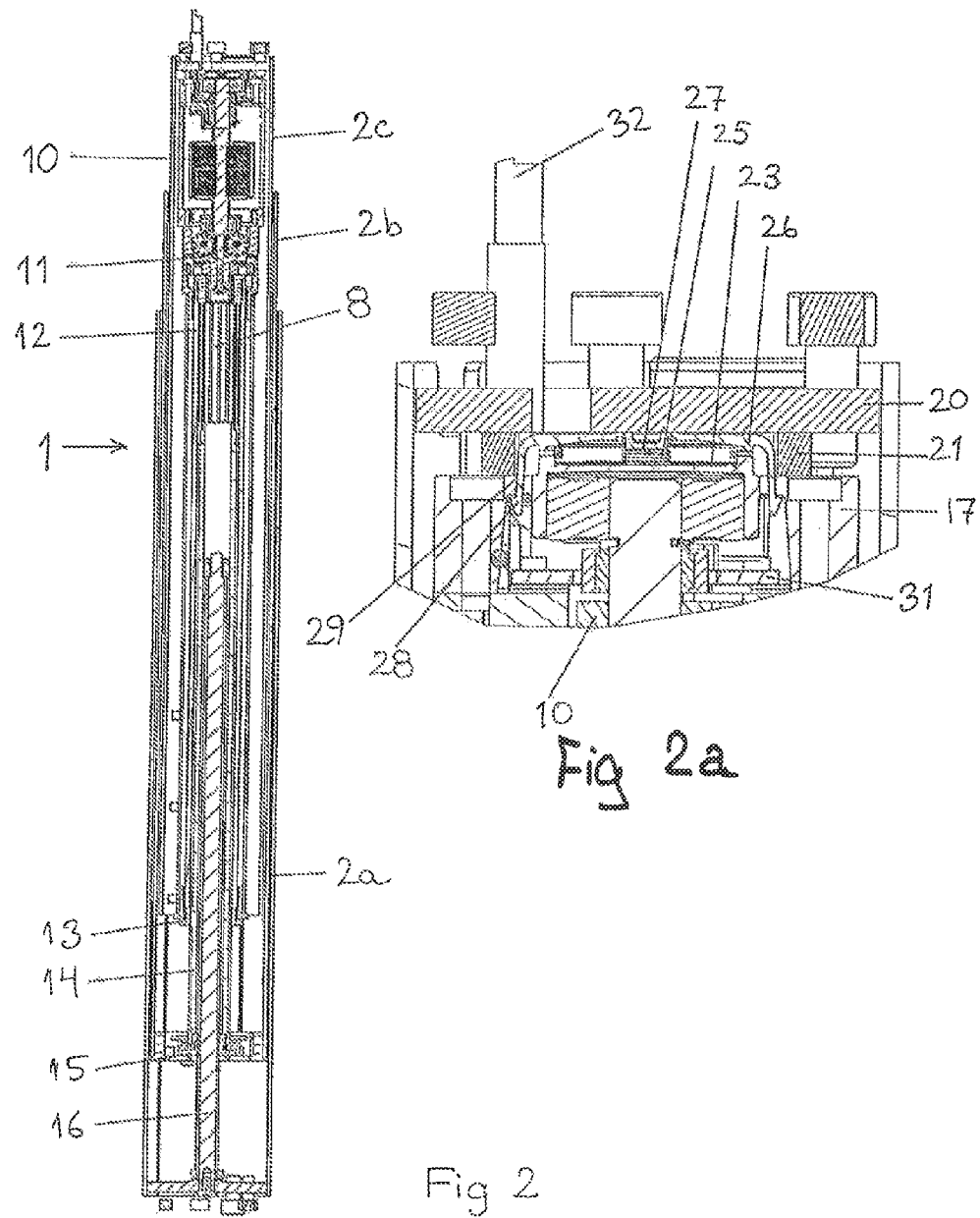
FIG. 2 shows a cross section through a column for the table with a detailed view of the construction of the squeeze protection device.

In the specific construction of the actuator 8 shown in FIG. 2, the actuator 8 is designed in such a way that it constitutes part of assembled column 1, where the motor 10, over a transmission 11, drives a drive tube 12 with a spindle nut 13, in which a hollow spindle 14 is driven on an external thread. The hollow spindle 14 is likewise equipped with a spindle nut 15 so that the hollow spindle 14 may be driven in relation to a solid spindle 16. The solid spindle 16 is secured to the bottom of the column and fixed against rotation. When the motor 10 is activated, then the members will be telescopically displaced in relation to each other in one direction or the other. When inserted in the lifting column 1, the actuator 8 will, by means of a control and operation unit 6, 7, be capable of performing an adjustment of the height of the table.

Figure 3:
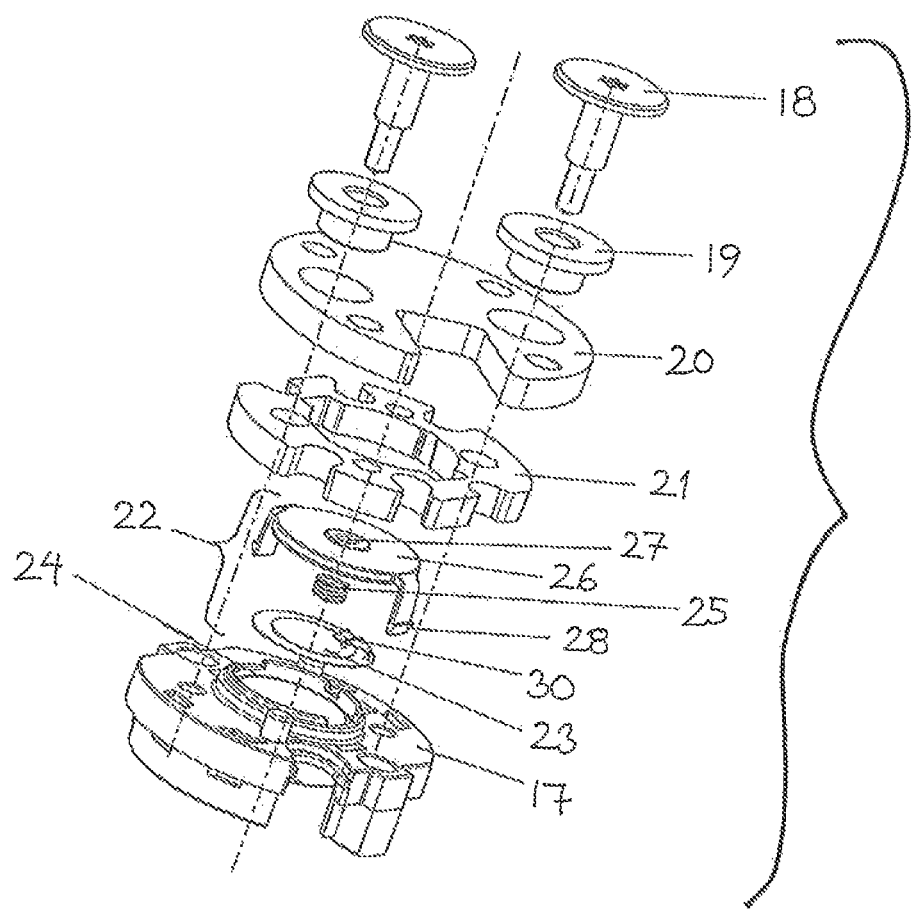
FIG. 3 shows an exploded view of the squeeze protection device.

The detailed drawing in FIG. 2a shows an enlarged upper end of the actuator 8 of FIG. 2 where the squeeze protection device is located. In FIG. 3 the same squeeze protection device is shown in an exploded view for the sake of clarity, An unyielding first part in the form of a motor rear fixture 17 for the motor 10 is with a fixture in the form of screws 18 secured to a second unyielding part in the form of a top flange 20 through rubber bushings 19. Between the rear fixture 17 and the top flange 20 is a flexible spacer ring 21, typically made from a rubber-like material. The spacer ring 21 is originally inserted in the construction to mechanically dampen noise of the lifting column by preventing vibrations from the motor 10 being transmitted acoustically into the parts of the column 1 which constitute the telescopic leg. In order to have a noise dampening effect, the compressible spacer ring 21 must be capable of yielding when the parts are moved. This further means that the forces exerted by the linear actuator 8, when they run through the distance from the motor rear fixture 17 to the top flange 20, will cause the compressible spacer ring 21 to be compressed or expanded.

The squeeze protection device 22 is located between the rear fixture 17 and the top flange 20. The device is based on a membrane-like circular piezo element 23, positioned on a ring-shaped projection 24 in connection with an end of the motor 10 on its motor rear fixture 17. The piezo element 23 is positioned so that it is not supported in the middle and thus may be moved moderately both in the downward and upward direction. In the center of the piezo element 23 is mounted a spring 25 which protrudes vertically upwardly. At its other end the spring 25 is connected to a housing 26, which in a preferred material is made from plastic - although it does not limit the selection of other materials in that the spring 25 fits over a pin 27, constructed on the inside of the plastic housing 26. In that the top of the plastic housing 26 rests against the top flange 20, pressure on the top flange 20 would simultaneously exert pressure on the plastic housing 26 and result in pressure on the spring 25 in connection with the piezo element 23, thus causing the piezo element 23 to be subjected to load.

The plastic housing 26 forms a protective housing for the piezo element 23 and is equipped with flaps 28, which together with counterparts 29, on the motor rear fixture 17, forms co-operative snap-locking means 28, 29 for retaining the plastic housing 26 in connection with the motor. The flaps 28 allow the plastic housing 26 to be pushed further down towards the motor rear fixture 17, but forms, due to the unciform design, a stop for the movement of the plastic housing 26 away from the motor rear fixture 17 when the top flange 20 is not mounted. Particularly expediently, the piezo element 23 is somewhat pre-stressed near the spring 25, so that the piezo element 23 is moved both in case of squeezing above and below the table top 5.

Figure 4:
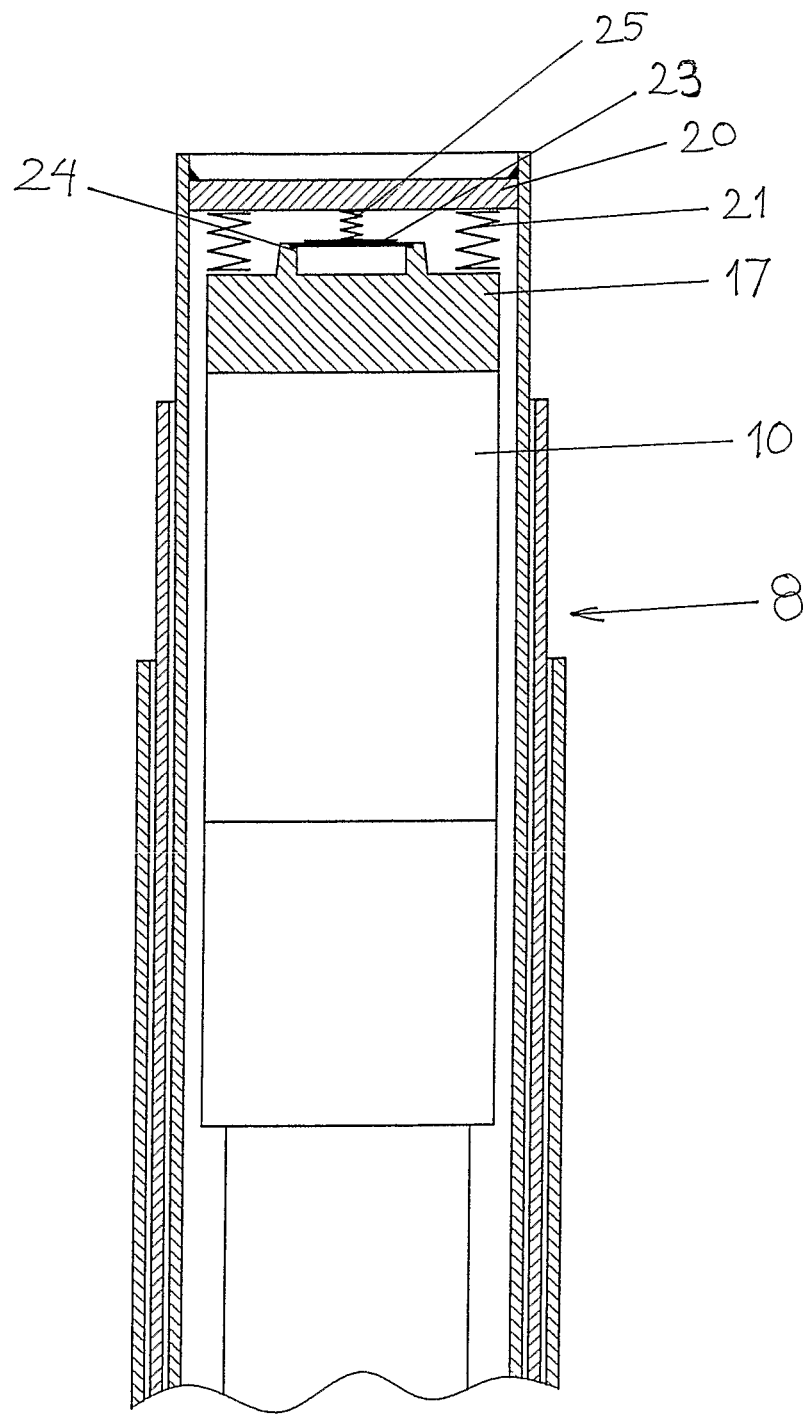
FIG. 4 shows a schematic diagram of the squeeze protection device mounted in connection with a column.

It should be noted that the described construction the travel of the piezo element 23 is proportional to the deformation of the compressible spacer ring 21. The forces exerted by the actuator 8 are thus divided between the compressible spacer ring 21 and the device for squeeze protection 22. The forces which may be absorbed in the squeeze protection device 22 are intelligible minimal compared to the forces received in the compressible spacer ring 21, for which reason the spring element in the compressible spacer ring 21 in relation to the spring element in the coil spring 25 in connection with the piezo element 23 forms a gear, with the purpose of protecting the piezo element 23 against overload. The principle of this is shown in FIG. 4 where a lifting column 8 is shown having an incorporated device for squeeze protection. It is noted that the piezo element 23 is embedded in a bowl-shaped holder 24 in connection with one end of the motor 10 and thus without hindrance may be moved upwardly and downwardly in the center point. Between a center point on the piezo element 23 and a flange 20, fixedly mounted on the column, is mounted a spring 25. It can be seen that the compressible spacer ring 21 also is shown as two springs, as a squeezing will cause a compression of the spacer ring 21. The load transferred to the piezo element 23 during a squeezing is thus minimal as the spacer ring 21 absorbs most of the load. As stated above, the two spring elements 21, 25 form a gear which reduces the mechanical load on the piezo element 23.

The signal generated by the piezo element 23 is a dynamic signal which reflects a change in the load of the actuator 8. A control unit 6, as shown in FIG. 1, which receives and processes the signals, must thus be fitted to respond to sudden changes, since they indicate a potential squeezing. On the other hand, scenarios must be foreseen where an indication error may occur, like during start-up of the motor 10 in the actuator 8.

The realization of the invention is particularly simple in that a standard actuator 8, as requested by the customer, is fitted during production with a squeeze protection device 22 as the entire squeeze protection device, in that the piezo element 23, the spring 25 and the plastic housing 26 constitute an integral modular unit. The squeeze protection device 22 as shown in FIG. 3 is also fitted with a cable 30, preferably having a plug connected, so that the signal from the piezo element 23 can be transferred in a convenient manner to a printed circuit board 31 mounted in the actuator 8, and forms a connection with the control unit 6 via a cabled connection 32 which extends externally out of the actuator 8. A control unit 6 can in this way react to a signal from the squeeze protection device 22, and in case of a squeezing, both stop the motor 10 and reverse the motor 10 so that a trapped object is released. When desired, this function may be constructed separately on the printed circuit board 31 in the actuator 8 or as mentioned above be implemented in the control unit 6.

Even though the invention here is explained in connection with an actuator constructed as a lifting column for adjustable tables, invention may also be utilized in connection with lifting columns for beds, cf. WO2009/033486 A1 Linak A/S. The invention may also be utilized in connection with single actuators, cf. WO 02/29284 A1 Linak A/S.

The invention claimed is:

1. A linear actuator which comprises:
a top flange;
an electric motor having a rear fixture facing the top flange;
a spindle,
a transmission located between the top flange and the spindle and connected between the electric motor and the spindle for rotation of the spindle,
a spindle nut non-rotationally mounted on the spindle and moveable back and forth along a length of the spindle based on a rotational direction of the motor and spindle, relative movement between the spindle and the spindle nut creating axial forces,
a drive tube connected to the spindle nut to move longitudinally with back and forth movement of the spindle nut relative to the spindle,
a compressible ring positioned between the top flange and the rear fixture, and
a squeeze protection device positioned within the compressible ring, said squeeze protection device including a force-detecting element for detecting dynamic deviations of axial forces on the drive tube and emitting signals under load for stopping operation of the electric motor, said squeeze protection device including snap-locking means which engages with snap-locking means on the rear fixture to retain the device in connection with the motor.

2. The linear actuator according to claim 1, wherein the squeeze protection device includes a housing and a spring.

3. The linear actuator according to claim 2, wherein said force-detecting element is a piezo element.

4. The linear actuator according to claim 3, wherein the piezo element is circular and rests on a circular rim of the rear fixture, so that a part of the piezo element is connected to the rear fixture and over the spring and the housing is connected to the top flange.

5. The linear actuator according to claim 4, wherein the piezo element includes a cable connection which is connected to a printed circuit board.

6. The linear actuator according to claim 2, wherein axial forces of compression pass from the top flange to the rear fixture and are distributed between the compressible ring and the squeeze protection device, so that the spring affects the piezo element for indication of compression.

7. The linear actuator according to claim 2, wherein said snap-locking means of said squeeze protection device comprises a plurality of uniform-shaped flaps which extend from said housing towards said rear fixture, said uniform-shaped flaps moving freely past said snap-locking means of said rear fixture when said housing is moved towards said rear fixture but engaging said snap-locking means of said rear fixtures as a stop when said housing is moved a predetermined distance away from said rear fixture.

8. The linear actuator according to claim 1, wherein said compressible ring is a one-piece element.

9. The linear actuator according to claim 1, wherein said compressible ring comprises a plurality of separated springs.

10. A telescopic lifting column comprising first and second mutually telescopic tubular members and a linear actuator positioned within said first and second tubular members, said linear actuator comprising:
 a top flange;
 an electric motor having a rear fixture facing the top flange;
 a spindle,
 a transmission located between the top flange and the spindle and connected between the electric motor and the spindle for rotation of the spindle,
 a spindle nut non-rotationally mounted on the spindle and moveable back and forth along a length of the spindle based on a rotational direction of the motor and spindle, relative movement between the spindle and the spindle nut creating axial forces,
 a drive tube connected to the spindle nut to move longitudinally with back and forth movement of the spindle nut relative to the spindle,
 a compressible ring positioned between the top flange and the rear fixture, and
 a squeeze protection device positioned within the compressible ring, said squeeze protection device including a force-detecting element for detecting dynamic deviations of axial forces on the activation element and emitting signals under load for stopping operation of the electric motor, said squeeze protection device including snap-locking means which engages with snap-locking means on the rear fixture to retain the device in connection with the motor.

11. An article of furniture with first and second mutually adjustable parts and a telescopic lifting column as defined in claim 10 attached to said first and second parts for relative movement therebetween, one end of said telescopic lifting column being attached to said first part and an opposite second end of said telescopic lifting column being attached to said second part.

12. The article of furniture according to claim 11, wherein said first part consists of a table top.

\* \* \* \* \*